United States Patent [19]

Sheldon et al.

[11] Patent Number: 4,932,359

[45] Date of Patent: Jun. 12, 1990

[54] METHOD FOR SANITIZING AND IMPROVING THE HATCHABILITY OF HATCHERY EGGS

[75] Inventors: Brian W. Sheldon; John T. Brake, both of Raleigh, N.C.

[73] Assignee: North Carolina State University, Raleigh, N.C.

[21] Appl. No.: 265,887

[22] Filed: Nov. 1, 1988

[51] Int. Cl.$^5$ .............................................. A01K 43/00
[52] U.S. Cl. ........................................................ 119/1
[58] Field of Search ................. 119/1, 35; 426/2, 258, 426/298, 300, 301

[56] References Cited

U.S. PATENT DOCUMENTS

| | | | |
|---|---|---|---|
| 1,045,178 | 11/1912 | Prenzlau | 426/300 |
| 1,063,043 | 5/1913 | Kulenkampff | 426/300 |
| 2,655,449 | 10/1953 | Almquist | 426/300 X |
| 2,704,531 | 3/1955 | Bailey | 119/1 |
| 3,123,045 | 3/1964 | Cosgrove et al. | 119/1 |
| 3,148,649 | 9/1964 | Moore et al. | 119/1 |
| 3,241,990 | 3/1966 | Harrison | 106/74 |

FOREIGN PATENT DOCUMENTS

| | | | |
|---|---|---|---|
| 0619156 | 8/1978 | U.S.S.R. | 119/35 |
| 0730335 | 4/1980 | U.S.S.R. | 426/300 |

*Primary Examiner*—Robert P. Swiatek
*Assistant Examiner*—T. Manahan
*Attorney, Agent, or Firm*—Richard E. Jenkins

[57] ABSTRACT

A process for sanitizing and increasing the hatchability of hatchery eggs by exposing the eggs to a solution of hydrogen peroxide during one or more stages of the hatchery process prior to hatching. The process unexpectedly results in a significant increase in the hatchability of the eggs treated.

16 Claims, No Drawings

METHOD FOR SANITIZING AND IMPROVING THE HATCHABILITY OF HATCHERY EGGS

TECHNICAL FIELD

This invention relates generally to the sanitization of hatchery eggs and more specifically to a safe and effective sanitization method which results in a significant increase in the hatchability of the eggs treated.

BACKGROUND ART

The environment of a poultry hatchery is very susceptible to contamination by microorganisms which can adversely affect hatchability of the eggs and can result in premature fowl mortality. Typical microorganisms which are believed to adversely affect fowl quality and cause premature fowl mortality include *Escherichia coli*, staphylocci sp., streptococci sp., and *Aspergillus fumigatus*. It is well known that poultry hatcheries must be operated under sanitary conditions which inhibit the growth of these microorganisms in order to maintain hatchability of the eggs and to insure the production of healthy fowl suitable for commercial sale and human consumption. Therefore, the development and maintenance of an effective hatchery sanitation program is essential to the successful operation of a poultry hatchery.

Most hatchery sanitation programs involve the use of a disinfectant to inhibit the growth of microorganisms and maintain a desirable level of hatchability of fertile hatchery eggs. Traditionally, formaldehyde has been utilized as the fumigant or disinfectant in many hatcheries in order to control the unwanted spread of microorganisms. Other moderately effective disinfectants such as quaternary ammonium compounds and phenolics are also currently utilized in the poultry industry.

In normal use, formaldehyde gas is generated and released in a poultry setter or hatcher by mixing formalin and potassium permanganate in specific ratios. This technique requires the handling and measuring of potentially hazardous chemicals by hatchery workers and possible exposure of the workers to the gas when initiating the chemical reaction. The use of formaldehyde is also a troublesome and relatively lengthy process since excess formaldehyde gas from poultry incubators must be adequately vented away from the hatchery environment. The unpleasant disinfectant odor of formaldehyde lingers in the hatchery long after decontamination and thereby tends to create an unpleasant working environment for the hatchery employees. The use of a formaldehyde disinfectant is further disadvantageous in that formaldehyde has recently been suspected of being carcinogenic and hence faces possible future governmental regulation of its use.

A need therefore exists for a safe and effective disinfectant for use in hatchery sanitation programs which will inhibit the growth of microorganisms and maintain a desirable level of hatchability of the eggs treated therewith. A need also exists for a disinfectant that is convenient to use and will minimize the time required for satisfactory sanitation. The present method overcomes the shortcomings of presently known sanitation methods and, surprisingly, significantly increases the hatchability of the fertile eggs.

Disclosure of the Invention

The present invention comprises exposing hatchery eggs to a solution of hydrogen peroxide prior to actual hatching in order to disinfect and to significantly increase the hatchability of the eggs treated. The substantial increase in hatchability is quite an unexpected and surprising result of the hydrogen peroxide treatment.

It is therefore an object of the present invention to provide a method for sanitizing hatchery eggs that is safe and convenient.

It is another object of the present invention to provide a method for sanitizing hatchery eggs that minimizes the exposure of hatchery workers to hazardous chemicals.

It is still another object of the present invention to provide a method for sanitizing hatchery eggs that minimizes the time required for complete sanitization of the eggs.

It is yet another object of the present invention to provide a method for sanitizing hatchery eggs that significantly increases the hatchability of the eggs treated thereby.

Best Mode For Carrying Out the Invention

In the typical hatchery process, hatchery eggs (i.e., eggs intended for incubation, not human consumption) from breeders are collected several times daily and placed in environmentally controlled storage rooms prior to incubation. The eggs are subsequently placed in egg trays or flats and transferred to incubators called setters which are environmentally controlled with respect to conditions such as temperature, relative humidity and air exchange. The eggs remain in the setters for about 18 days and are then transferred to a different type of incubator called a hatcher which is environmentally controlled to maintain temperature and humidity conditions optimal for the actual hatching of eggs. Depending on the type of fowl, pipping and actual hatching generally begin within a few days after transfer of the eggs to the hatchers.

The process of the present invention comprises exposing hatchery eggs to a solution of hydrogen peroxide during one or more stages of the hatchery process. It should be understood that hydrogen peroxide or hydrogen peroxide solution herein refers to a solution comprising hydrogen peroxide diluted to varying percentages with water. The hydrogen peroxide solution used in the present invention preferably comprises hydrogen peroxide diluted with water to a total hydrogen peroxide concentration of about 3 to 7 percent. Most preferably, the solution is a dilute solution of about 5% hydrogen peroxide.

PREFERRED SOLUTION

Any commercially available hydrogen peroxide solution may be utilized in the invention such as that manufactured by Degussa Corporation of Ridgefield Park, New Jersey. The solution may be purchased in a concentrated form (generally 30%, 35%, 50% or 70% hydrogen peroxide) and diluted to the desired concentration or it may be purchased as a pre-diluted solution ready for immediate utilization in the hatchery. It is desirable to utilize distilled, deionized water to produce the dilute hydrogen peroxide solution in order to help maintain the stability of the solution.

APPLICATION OF SOLUTION

The solution may be applied to the hatchery eggs in any suitable manner such as by spraying, dipping or by the use of an automatic fogger or atomizer. The use of an automatic fogging or spraying system is advantageous in that it minimizes exposure of the worker to the hydrogen peroxide solution. A suitable fogging system for use in the instant invention could comprise a pneumatic nozzle driven by an air compressor. It is important to insure compatibility of the fogger parts that contact the hydrogen peroxide solution, and stainless steel or teflon are recommended fabrication materials for these parts.

The hydrogen peroxide solution may be applied to the eggs at a variety of stages during the hatchery process. For example, the eggs may be exposed to the hydrogen peroxide solution at the time of collection from the breeders prior to storage and setting. The eggs may also be treated with the hydrogen peroxide solution during actual storage, but they are most typically exposed to the hydrogen peroxide solution during the transfer of the eggs from the storage rooms to the setters. In this particular application technique, the eggs are removed from the storage rooms and placed in plastic egg flats (approximately 30 eggs per flat) that are fabricated from a plastic composition that will not react with hydrogen peroxide. The hydrogen peroxide solution is then applied in an amount sufficient to fully cover the eggs with a thin layer of solution so as to insure the inhibition of microorganism growth. A plastic hand sprayer having a nozzle to control the fineness of the spray is useful in this type of application although other application equipment is contemplated as described hereinbefore. Finally, the eggs are allowed to air dry at ambient temperatures prior to placement in the setters.

The eggs may also be treated after transfer to the setters, and an automatic fogging system can be utilized in this method of application. When utilizing a fogger or atomizer, the eggs are normally exposed to the fog for about 20 to 40 minutes, preferably for about 30 minutes at typical setter operating conditions (37.5° C., 53% relative humidity). The automatic fogger or atomizer can be utilized to apply the hydrogen peroxide solution at selected intervals throughout the setting process and this intermittent method of treatment may be used to optimize the effectiveness of the hydrogen peroxide solution.

Optionally, the eggs may be treated at the time of transfer from the setters to the hatchers and may also be fogged or sprayed while contained within the hatcher until the actual time of pipping and hatching. A solution having a higher concentration of hydrogen peroxide can also be utilized to disinfect the setters and hatchers before and after the incubation processes.

It should be noted that the method of the present invention is contemplated for use in any type of poultry hatchery for any species of fowl including broilers, turkeys, ducklings and quail. The effectiveness of hydrogen peroxide as a disinfectant can be seen with reference to test results illustrated in Table 1 below wherein 540 eggs were treated with a fogging system at the setter and 5 eggs per treatment were then sampled and the data averaged.

TABLE 1

| Disinfectant | | Microorganisms Per Egg |
| --- | --- | --- |
| Control Group | (30 Minute Exposure To Distilled Deionized Water) | 66,069 |
| Formaldehyde | (Triple Strength, 30 Minute Exposure) | 0 |

TABLE 1-continued

| Disinfectant | | Microorganisms Per Egg |
| --- | --- | --- |
| Hydrogen Peroxide | (5% Concentration By Weight, 30 Minute Exposure) | 24 |

The utilization of a hydrogen peroxide solution as a sanitizer for hatchery eggs is a safe and effective means for inhibiting the growth of microorganisms which may adversely affect the hatchability of fertile eggs and the quality of the fowl after hatching. The use of hydrogen peroxide does not require the handling of hazardous chemicals and does not require venting of unpleasant fumes from the hatchery facility. Hydrogen peroxide treatment is also believed to increase the quality of chicks hatched and to reduce the number of chick deaths occurring within a few days after hatching. The method of the invention additionally results in less interior contamination within the shell among the percentage of eggs that do not hatch.

Finally, and very importantly, the exposure of hatchery eggs to hydrogen peroxide prior to hatching has quite unexpectedly been found to significantly increase the hatchability of the eggs treated. The use of hydrogen peroxide in lieu of formaldehyde surprisingly increases the hatchability of fertile eggs by 2 to 3% which is a significant increase in hatchability that translates into a very significant increase in the production of fowl from hatcheries. The exposure of hatchery eggs to hydrogen peroxide during the hatchery process therefore not only very effectively combats surface microbial contaminants but also, surprisingly, very significantly increases the hatchability of the eggs treated. The increase in hatch rate can be seen with reference to test results illustrated in Table 2 below wherein 540 eggs were hand sprayed to wetness at transfer to the setter and 540 eggs were exposed to formaldehyde gas in the setter.

TABLE 2

| Disinfectant | | Hatch Rate |
| --- | --- | --- |
| Formaldehyde | (Triple Strength, 60 Minute Exposure) | 87.6% |
| Hydrogen Peroxide | (5% Concentration by Volume, Sprayed to Wetness) | 90.5% |

Upon observation of the chicks during the test, applicant observed no adverse effects on chick quality due to the hydrogen peroxide treatment of the invention. For example, chick coloration was normal, chick vigor and attentiveness was normal, chick size distribution was normal, and no chick respiratory problems were apparent.

The exact mechanism responsible for the enhancement of hatchability by hydrogen peroxide is not fully understood at this time. Several mechanisms that may account for the increased hatchability include, firstly, a chemical alteration of the proteinaceous outer cuticle of the egg which functions to regulate respiratory activity and water loss across the shell and shell membranes and which acts as a barrier preventing microbial invasion into the egg. This cuticle alteration is believed to permit greater exchange of respiratory gases and to thereby promote increased hatchability. A second mechanism may be the generation of elevated oxygen levels within the shell due to the diffusion of hydrogen peroxide across the shell and shell membranes and its ultimate decomposition to oxygen. This elevated oxygen level may provide a boost to the developing embryo. However, regardless of the mechanism of which the phenomenon is achieved, the increased hatch rate is an unexpected but significant advantage provided by the use of hydrogen peroxide as provided herein. This advantage has important economic implications for the poultry industry since a 3% increase in hatchability would result in an annual increase of about 200 million chicks in the U.S. (based on a total hatch of 5 billion broiler and turkey eggs in 1986).

It will thus be understood that various details of the invention may be changed without departing from the scope of the invention. Furthermore, the foregoing description is for the purpose of illustration only, and not for the purpose of limitation—the invention being defined by the following claims.

What is claimed is:

1. A process for sanitizing and increasing the hatchability of hatchery poultry eggs comprising:
   collecting the hatchery eggs;
   storing the collected hatchery eggs in environmentally controlled storage rooms;
   transferring the hatchery eggs from the storage rooms to setters;
   transferring the hatchery eggs from the setters to hatchers; and
   exposing the hatchery eggs to a topical application of a solution of hydrogen peroxide at one or more of the aforesaid stages during the hatchery process and prior to hatching, said hydrogen peroxide solution being applied to said hatchery eggs without removing the cuticles therefrom and without affecting the viability of said eggs for later hatching; whereby microbial contaminants on the surfaces of the eggs are reduced and hatchability of the eggs is increased.

2. A process according to claim 1 wherein the solution of hydrogen peroxide contains from about 3 to 7% hydrogen peroxide.

3. A process according to claim 1 wherein the solution of hydrogen peroxide comprises hydrogen peroxide and distilled deionized water.

4. A process according to claim 1 wherein the eggs are exposed by applying the solution of hydrogen peroxide to the eggs with a hand sprayer.

5. A process according to claim 1 wherein the eggs are exposed by being dipped into the solution of hydrogen peroxide.

6. A process according to claim 1 wherein the eggs are exposed by applying the solution of hydrogen peroxide to the eggs with an automatic fogging system.

7. A process according to claim 1 wherein the eggs are exposed to the solution of hydrogen peroxide at the time of collection, prior to storage, setting and hatching.

8. A process according to claim 1 wherein the eggs are exposed to the solution of hydrogen peroxide while they are contained in the storage rooms.

9. A process according to claim 1 wherein the eggs are exposed to the solution of hydrogen peroxide during the transfer of the eggs from the storage rooms to the setters.

10. A process according to claim 9 wherein the eggs are allowed to air dry at ambient temperatures prior to placement in the setters.

11. A process according to claim 1 wherein the eggs are exposed to the solution of hydrogen peroxide while they are contained within the setters.

12. A process according to claim 11 wherein the eggs are exposed to the solution of hydrogen peroxide by an automatic fogging system.

13. A process according to claim 12 wherein the solution of hydrogen peroxide is applied for a period of about 30 minutes.

14. A process according to claim 12 wherein the solution of hydrogen peroxide is applied at selected intervals.

15. A process according to claim 1 wherein the eggs are exposed to the solution of hydrogen peroxide during the transfer of the eggs from the setters to the hatchers.

16. A process according to claim 1 wherein the eggs are exposed to the solution of hydrogen peroxide while they are contained in the hatchers.

* * * * *